(12) United States Patent
Katagawa et al.

(10) Patent No.: US 8,823,623 B2
(45) Date of Patent: Sep. 2, 2014

(54) LIQUID CRYSTAL DRIVER, LIQUID CRYSTAL DRIVING METHOD AND LIQUID CRYSTAL DISPLAY DEVICE

(75) Inventors: Koichi Katagawa, Kanagawa (JP); Hideo Morita, Kanagawa (JP); Yoshiki Shirochi, Chiba (JP); Hideaki Kawaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 11/975,041

(22) Filed: Oct. 17, 2007

(65) Prior Publication Data

US 2008/0284707 A1 Nov. 20, 2008

(30) Foreign Application Priority Data

Nov. 1, 2006 (JP) ................... 2006-297977

(51) Int. Cl.
*G09G 3/36* (2006.01)
(52) U.S. Cl.
USPC .............................................................. 345/96
(58) Field of Classification Search
USPC .............................................................. 345/96
See application file for complete search history.

(56) References Cited

U.S. PATENT DOCUMENTS

| 2005/0259061 | A1* | 11/2005 | Aoki | 345/96 |
| 2005/0275611 | A1* | 12/2005 | Aoki | 345/96 |
| 2007/0024563 | A1* | 2/2007 | Oura | 345/98 |

FOREIGN PATENT DOCUMENTS

| JP | 07-129133 | 5/1995 |
| JP | 2002-189458 | 7/2002 |
| JP | 2004-133159 | 4/2004 |
| JP | 2004-361943 | 12/2004 |
| JP | 2005-527855 | 9/2005 |
| JP | 2005-326624 | 11/2005 |
| JP | 2005-352315 | 12/2005 |
| JP | 2006-079043 | 3/2006 |
| JP | 2006-195231 | 7/2006 |
| JP | 2006-243519 | 9/2006 |
| JP | 2006-285092 | 10/2006 |

* cited by examiner

*Primary Examiner* — Robin Mishler
(74) *Attorney, Agent, or Firm* — Robert J. Depke; The Chicago Technology Law Group, LLC

(57) ABSTRACT

A liquid crystal driver is provided, in which a frame rate of an input image signal is multiplied by 2N (N is an integer of one or more); each frame is divided into N positive field(s) and N negative field(s) respectively; the image signal is supplied to a liquid crystal panel with a positive polarity in a positive field; and the image signal is supplied to the liquid crystal panel with a negative polarity in a negative field. The liquid crystal driver includes a corrected image signal generator configured to generate a corrected image signal having the same amount of correction added to the positive field and negative field. The corrected image signal is supplied to the liquid crystal panel with the positive polarity in the positive field and the corrected image signal is supplied to the liquid crystal panel with the negative polarity in the negative field.

14 Claims, 11 Drawing Sheets

| Correction Amount | | Gray Scale of Image Signal 2N Fields Before | | | | |
|---|---|---|---|---|---|---|
| | | 0 | 1024 | 2048 | 3072 | 4095 |
| Gray Scale of Present Image Signal | 0 | 0 | 0 | 0 | 0 | 0 |
| | 1024 | 300 | 0 | -500 | -400 | -300 |
| | 2048 | 200 | 300 | 0 | -300 | -200 |
| | 3072 | 100 | 200 | 300 | 0 | -100 |
| | 4095 | 0 | 0 | 0 | 0 | 0 |

FIG. 10A

| Correction Amount | | Gray Scale of Image Signal 2N Fields Before | | | | |
|---|---|---|---|---|---|---|
| | | 0 | 1024 | 2048 | 3072 | 4095 |
| Gray Scale of Present Image Signal | 0 | 0 | 0 | 0 | 0 | 0 |
| | 1024 | 600 | 0 | −1000 | −800 | −600 |
| | 2048 | 400 | 600 | 0 | −600 | −400 |
| | 3072 | 200 | 400 | 600 | 0 | −200 |
| | 4095 | 0 | 0 | 0 | 0 | 0 |

FIG. 10B

| Correction Amount | | Gray Scale of Image Signal 2N Fields Before | | | | |
|---|---|---|---|---|---|---|
| | | 0 | 1024 | 2048 | 3072 | 4095 |
| Gray Scale of Present Image Signal | 0 | 0 | 0 | 0 | 0 | 0 |
| | 1024 | 300 | 0 | −500 | −400 | −300 |
| | 2048 | 200 | 300 | 0 | −300 | −200 |
| | 3072 | 100 | 200 | 300 | 0 | −100 |
| | 4095 | 0 | 0 | 0 | 0 | 0 |

LIQUID CRYSTAL DRIVER, LIQUID CRYSTAL DRIVING METHOD AND LIQUID CRYSTAL DISPLAY DEVICE

CROSS REFERENCES TO RELATED APPLICATIONS

The present invention contains subject matter related to Japanese Patent Application JP 2006-297977 filed in the Japanese Patent Office on Nov. 1, 2006, the entire contents of which being incorporated herein by reference.

BACKGROUND OF THE INVENTION

1. Field of the Invention

The present invention relates to a liquid crystal driver and a liquid crystal driving method in which same image signal is supplied to a liquid crystal panel in a unit interval with an even number of fields composed of a positive field and a negative field, and to a liquid crystal display device employing the liquid crystal driver and the liquid crystal driving method, with which picture quality is improved at the time of displaying a moving picture.

2. Description of the Related Art

In recent years, an active matrix liquid crystal panel has been improved to have high resolution and high luminance, and as a result, the liquid crystal panel is used not only as a display device for a personal computer and a portable information terminal (such as a mobile phone unit) but also as a display device for a television receiver which is primarily intended to display a moving picture. In addition, personal computers and portable information terminals have recently been used for receiving and displaying moving picture contents.

In an active matrix liquid crystal panel, a liquid crystal material is sealed between a drive substrate (silicon substrate, for example) in which a pixel electrode is formed and a glass substrate in which a transparent common electrode is formed. Since light transmittance of a liquid crystal material changes in response to a potential difference between the pixel electrode and the common electrode by writing an image signal to the pixel electrode (applying voltage corresponding to the luminance of the image signal), the incident light is modulated so that an image is displayed.

In a liquid crystal panel, image deterioration such as a residual image due to slow response speed (slow response in the change of the light transmittance of the liquid crystal material) may occur at the time of displaying a moving picture that moves fast (in which luminance fluctuates greatly). In Japanese Unexamined Patent Application Publication No. 2002-189458 (JP 2002-189458 A), there is proposed that time to reach a desired luminance is shortened by using a characteristic that the larger the change in drive voltage becomes, the faster the response speed of a liquid crystal panel becomes. JP 2002-189458 A proposes that a difference between the luminance of an image signal of one frame before and the luminance of the image signal of the present frame is obtained and a correction amount of luminance corresponding to the difference is added to and subtracted from the luminance of the image signal of the present frame so that the corrected image signal is supplied to the liquid crystal panel.

SUMMARY OF THE INVENTION

As a method for driving an active matrix liquid crystal panel, there is such a driving method that same image signal is supplied to the liquid crystal panel in a unit interval with an even number of fields composed of a positive field and a negative field so that deterioration of the liquid crystal panel is controlled by maintaining DC balance of voltage applied to the liquid crystal panel.

In the driving method, multiplication processing is performed to multiply a frame rate of the input image signal by 2N (N is an integer of one or more). Each frame is divided into N positive field(s) and N negative field(s), respectively. Then, the image signal with a positive polarity for the voltage of a common electrode is supplied to the liquid crystal panel in a positive field and written in the pixel electrode. On the other hand, the image signal with a negative polarity for the voltage of the common electrode is supplied to the liquid crystal panel in a negative field and written in the pixel electrode.

FIG. 1 shows the multiplication processing in the case of N=1, where an input image signal having frames A, B, C, D - - - are output as the image signal having the frames respectively composed of two fields A1 and A2, B1 and B2, C1 and C2, D1 and D2, - - - . (Although delay time caused by the multiplication processing is disregarded and not illustrated in FIG. 1, actually there occurs a delay of several fields due to delayed multiplication processing.) In this case, as exemplarily shown in FIG. 2A, first-half fields A1, B1, C1, D1, - - - are positive fields where the image signal with the positive polarity is supplied to the liquid crystal panel. Similarly, second-half fields A2, B2, C2, D2 - - - are negative fields where the image signal with the negative polarity is supplied to the liquid crystal panel (to the contrary, the first-half fields may be the negative fields and the second-half fields may be the positive fields).

If such driving method is used, image deterioration such as an residual image may occur since the luminance may not reach an intended level within one frame regarding the frame C where the luminance changes greatly as the response of the liquid crystal panel is shown in FIG. 2B.

It is desirable to maintain DC balance of the voltage applied to a liquid crystal panel as described above and improve the picture quality at the time of displaying a moving picture, in the case of employing a driving method of supplying same image signal to the liquid crystal panel in a unit interval with an even number of fields composed of a positive field and a negative field so that the DC balance is maintained.

According to an embodiment of the present invention, there is provided a first liquid crystal driver in which a frame rate of an input image signal is multiplied by 2N (N is an integer of one or more). Each frame is divided into N positive field(s) and N negative field(s), respectively. The image signal is supplied to a liquid crystal panel with a positive polarity in a positive field and the image signal is supplied to the liquid crystal panel with a negative polarity in a negative field. The liquid crystal driver includes a corrected image signal generator configured to generate a corrected image signal having the same amount of correction added to the positive field and the negative field in response to a luminance of the image signal of the N positive field(s) and N negative field(s) respectively divided from the each frame and a luminance of the image signal 2N fields before the respective positive field and negative field.

The corrected image signal generated by the corrected image signal generator is supplied to the liquid crystal panel with the positive polarity in the positive field and the corrected image signal generated by the corrected image signal generator is supplied to the liquid crystal panel with the negative polarity in the negative field.

According to another embodiment of the present invention, there is provided a first liquid crystal driving method. In the method, a frame rate of an input image signal is multiplied by 2N (N is an integer of one or more). Each frame is divided into N positive field(s) and N negative field(s) respectively. The image signal is supplied to a liquid crystal panel with a positive polarity in a positive field and the image signal is supplied to the liquid crystal panel with a negative polarity in a negative field. The liquid crystal driving method including the steps of:

generating a corrected image signal having the same amount of correction added to the positive field and the negative field in response to a luminance of the image signal of the N positive field(s) and N negative field(s) respectively divided from the each frame and a luminance of the image signal 2N fields before the respective positive field and negative field; and supplying the corrected image signal generated at the generating step to the liquid crystal panel with the positive polarity in the positive field and the corrected image signal generated at the generating step to the liquid crystal panel with the negative polarity in the negative field.

According to further embodiment of the present invention, there is provided a first liquid crystal display device including a liquid crystal panel and a drive circuit. In the drive circuit, a frame rate of an input image signal is multiplied by 2N (N is an integer of one or more). Each frame is divided into N positive field(s) and N negative field(s) respectively. The image signal is supplied to the liquid crystal panel with a positive polarity in a positive field and the image signal is supplied to a liquid crystal panel with a negative polarity in the negative field. In the liquid crystal display device, the drive circuit includes a corrected image signal generator configured to generate a corrected image signal having the same amount of correction added to the positive field and the negative field in response to a luminance of the image signal of the N positive field(s) and N negative field(s) respectively divided from the each frame and a luminance of the image signal 2N fields before the respective positive field and negative field. The corrected image signal generated by the corrected image signal generator is supplied to the liquid crystal panel with the positive polarity in the positive field, and the corrected image signal generated by the corrected image signal generator is supplied to the liquid crystal panel with the negative polarity in the negative field.

According to the embodiments of the present invention, the same image signal is supplied to a liquid crystal panel in a unit interval with an even number of fields composed of a positive field and a negative field in order to maintain DC balance of the voltage applied to the liquid crystal panel. In such driving system, a corrected image signal is generated, having the same amount of correction added to the positive field and negative field in response to a luminance of the image signal of the positive field and negative field divided from the each frame and a luminance of the image signal 2N fields before. Subsequently, the corrected image signal is supplied to the liquid crystal panel with the positive polarity in the positive field, and with the negative polarity in the negative field.

Since the corrected image signal is supplied to the liquid crystal panel with the amount of correction added as described above in the positive field and negative field with inverted polarities, time to reach an intended luminance is reduced and the picture quality at the time of displaying a moving picture is improved. Further, since the same correction amount is added to the positive field and negative field, DC balance of the voltage applied to the liquid crystal panel is maintained. As a result, the picture quality at the time of displaying a moving picture can be improved while suppressing the deterioration of the liquid crystal panel by maintaining the DC balance.

According to further another embodiment of the present invention, there is provided a second liquid crystal driver in which a frame rate of an input image signal is multiplied by 2N (N is an integer of two or more). Each frame is divided into N positive fields and N negative fields, respectively. The image signal is supplied to a liquid crystal panel with a positive polarity in a positive field and the image signal is supplied to the liquid crystal panel with a negative polarity in a negative field. The liquid crystal driver includes a corrected image signal generator configured to generate a corrected image signal for the positive field and negative field in response to a luminance of the image signal of the N positive fields and N negative fields respectively divided from the each frame and a luminance of the image signal 2N fields before the respective positive field and negative field.

The corrected image signal generator adds a predetermined amount of correction to a front field alone among the N fields out of the positive fields and negative fields supplying first the image signal to the liquid crystal panel, and divides and adds the predetermined amount of correction to two or more fields out of the positive fields and negative fields not supplying first the image signal to the liquid crystal panel.

The corrected image signal generated by the corrected image signal generator is supplied to the liquid crystal panel with the positive polarity in the positive field and the corrected image signal generated by the corrected image signal generator is supplied to the liquid crystal panel with the negative polarity in the negative field.

According to still another embodiment of the present invention, there is provided a second liquid crystal driving method. In the method, a frame rate of an input image signal is multiplied by 2N (N is an integer of two or more). Each frame is divided into N positive fields and N negative fields respectively. The image signal is supplied to a liquid crystal panel with a positive polarity in a positive field and the image signal is supplied to the liquid crystal panel with a negative polarity in a negative field. The liquid crystal driving method including the steps of:

generating a corrected image signal for the positive field and the negative field in response to a luminance of the image signal of the N positive fields and N negative fields respectively divided from the each frame and a luminance of the image signal 2N fields before the positive field and negative field;

adding a predetermined amount of correction to a front field alone among the N fields out of the positive fields and negative fields supplying first the image signal to the liquid crystal panel;

dividing and adding the predetermined amount of correction to two or more fields out of the positive fields and negative fields not supplying first the image signal to the liquid crystal panel; and supplying the corrected image signal generated at the preceding steps to the liquid crystal panel with the positive polarity in the positive field and the corrected image signal generated at the preceding steps to the liquid crystal panel with the negative polarity in the negative field.

According to still further embodiment of the present invention, there is provided a second liquid crystal display device including a liquid crystal panel and a drive circuit. In the drive circuit, a frame rate of an input image signal is multiplied by 2N (N is an integer of two or more). Each frame is divided into N positive fields and N negative fields respectively. The image signal is supplied to the liquid crystal panel with a positive polarity in a positive field and the image signal is supplied to the liquid crystal panel with a negative polarity in a negative field. In the liquid crystal display device, the drive circuit includes a corrected image signal generator configured to generate a corrected image signal for the positive field and the negative field in response to a luminance of the image signal of the N positive fields and N negative fields respectively divided from the each frame and a luminance of the image signal 2N fields before the respective positive field and negative field. The corrected image signal generator adds a predetermined amount of correction to a front field alone among the N fields out of the positive fields and negative fields supplying first the image signal to the liquid crystal panel, and divides and adds the predetermined amount of correction to two or more fields out of the positive fields and negative fields not supplying first the image signal to the liquid crystal panel. The corrected image signal generated by the corrected image signal generator is supplied to the liquid crystal panel with the positive polarity in the positive field, and the corrected image signal generated by the corrected image signal generator is supplied to the liquid crystal panel with the negative polarity in the negative field.

According to the embodiments of the present invention, the same image signal is supplied to a liquid crystal panel in a unit interval with an even number of fields composed of a positive field and a negative field in order to maintain DC balance of the voltage applied to the liquid crystal panel. In such driving system, a corrected image signal is generated for the positive field and negative field in response to a luminance of the image signal of the positive field and negative field divided from each frame and a luminance of the image signal 2N fields before. Subsequently, the corrected image signal is supplied to the liquid crystal panel with the positive polarity in the positive field, and with the negative polarity in the negative field. The corrected image signal is generated such that a predetermined amount of correction is added to the front field alone among the N fields (here, two or more) out of the positive fields and negative fields supplying first the image signal to the liquid crystal panel and the predetermined amount of correction is divided and added to two or more fields out of the positive fields and negative fields not supplying first the image signal to the liquid crystal panel. Then, the corrected image signal is supplied to the liquid crystal panel with the positive polarity in the positive field, and the corrected image signal is supplied to the liquid crystal panel with the negative polarity in the negative field.

As described above, a corrected image signal is supplied to a liquid crystal panel. The corrected image signal is generated by adding a large amount of correction to the front field alone in comparison to the other fields out of the positive fields and negative fields supplying first the image signal to the liquid crystal panel. Accordingly, time to reach an intended luminance is shortened and the picture quality at the time of displaying a moving picture is improved. Further, the same correction amount is divided and added to two or more fields out of the positive fields and negative fields not supplying first the image signal to the liquid crystal panel. Accordingly, DC balance of the voltage applied to the liquid crystal panel is maintained when N (two or more) positive fields and N negative fields divided from one frame are respectively viewed as the whole. As a result, the picture quality at the time of displaying a moving picture can be improved while suppressing the deterioration of the liquid crystal panel by maintaining the DC balance.

According to the embodiments of the present invention, a driving system of supplying the same image signal to a liquid crystal panel in a unit interval with an even number of fields composed of a positive field and a negative field is employed so as to suppress the deterioration of the liquid crystal panel by maintaining DC balance of the voltage applied to the liquid crystal panel. According to the embodiments, time to reach an intended luminance is shortened and the picture quality at the time of displaying a moving picture can be improved while suppressing the deterioration of the liquid crystal panel by maintaining the DC balance.

Particularly, according to the second liquid crystal driver, liquid crystal driving method and liquid crystal display device of the embodiments of the present invention, time to reach an intended luminance can be shortened and the picture quality at the time of displaying a moving picture can be improved while suppressing the deterioration of the liquid crystal panel by maintaining the DC balance.

BRIEF DESCRIPTION OF THE DRAWINGS

FIGS. 10A and 10B are exemplary diagrams showing contents of a correction table in FIG. 9.

DESCRIPTION OF THE PREFERRED EMBODIMENTS

Figure 3:
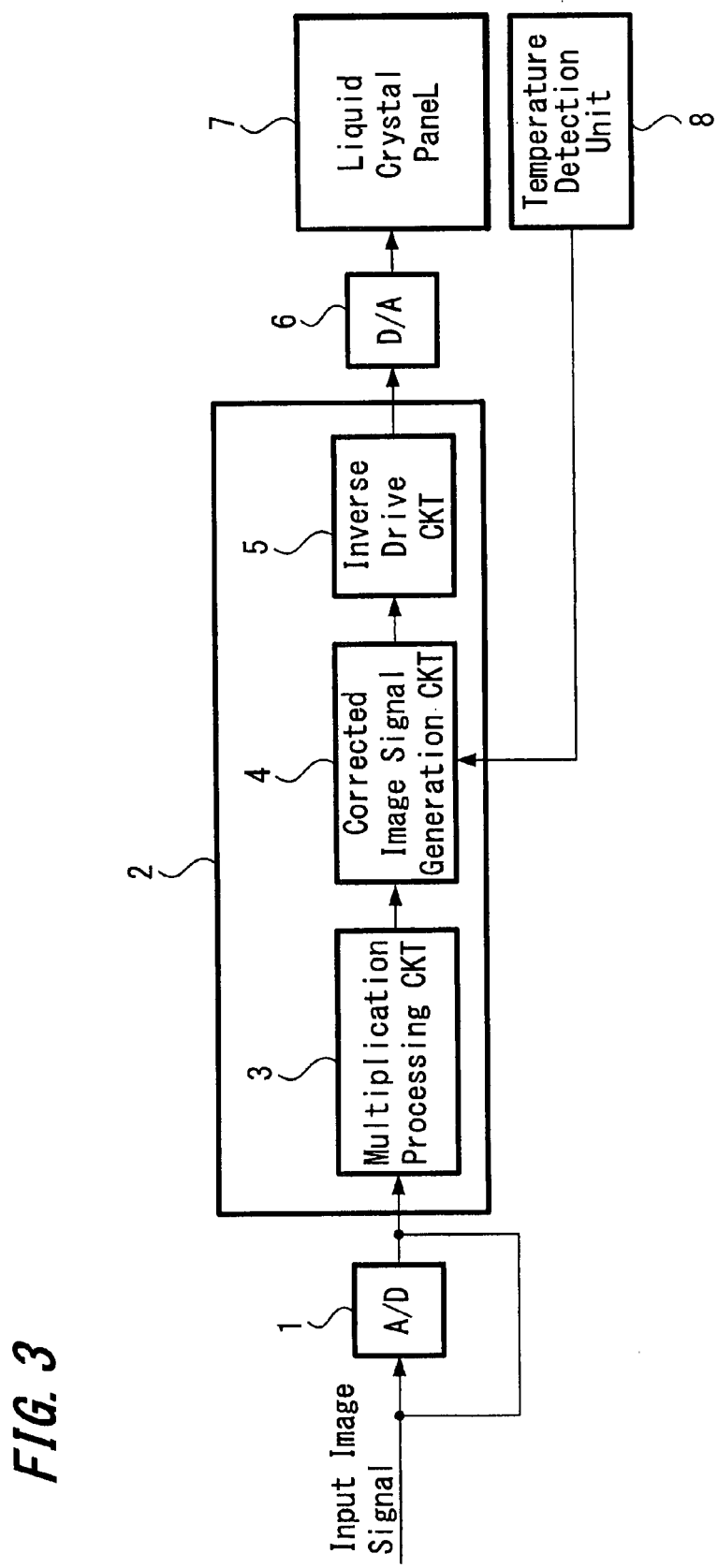
FIG. 3 is a block diagram showing a configuration example of a first liquid crystal display device to which an embodiment of the present invention is applied.

First Liquid Crystal Display Device to which an Embodiment of the Present Invention is Applied Hereinafter, preferred embodiments of the present invention are specifically described using the accompanied drawings. First, there is described a liquid crystal display device to which a first liquid crystal driver, liquid crystal driving method and liquid crystal display device according to an embodiment of the present invention are applied. FIG. 3 is a block diagram showing a configuration example of essential portions of the liquid crystal display device. An analogue image signal input to the liquid crystal display device is converted into a digital signal at an A/D converter 1 and then supplied to a drive circuit section 2. On the other hand, a digital image signal input to the liquid crystal display device is supplied directly to the drive circuit section 2. (For example, image signals input from a video input terminal, obtained after such processing as channel selection and demodulation in a television receiver, and decoded after downloading through network in a personal computer and a portable information terminal are used)

Figure 1:
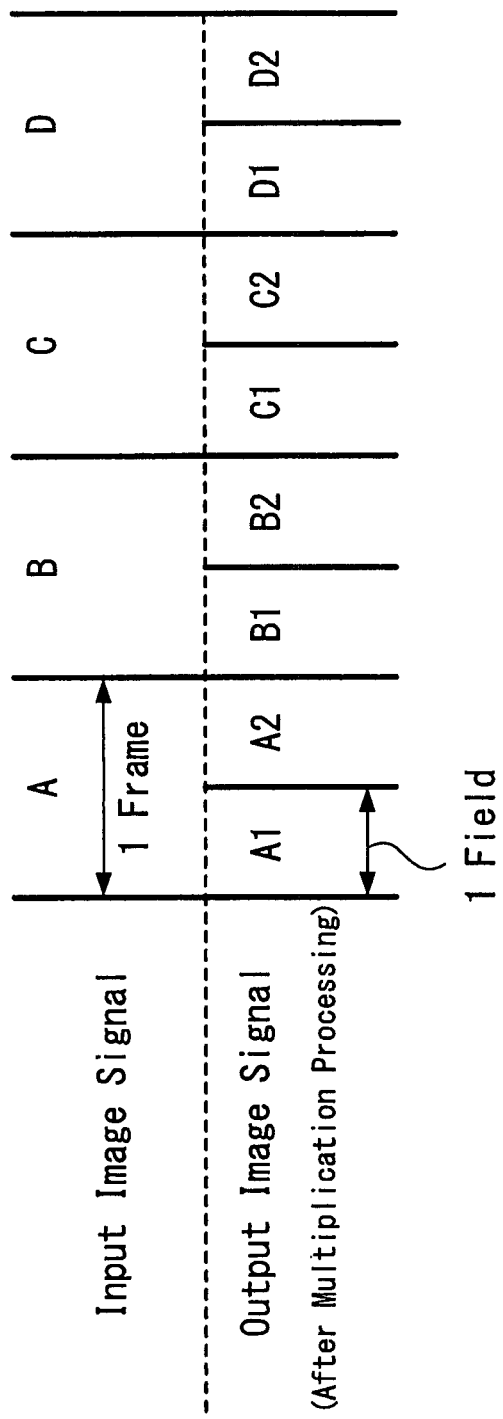
FIG. 1 is an exemplary diagram showing multiplication processing on an image signal.
Figures 2A, 2B:
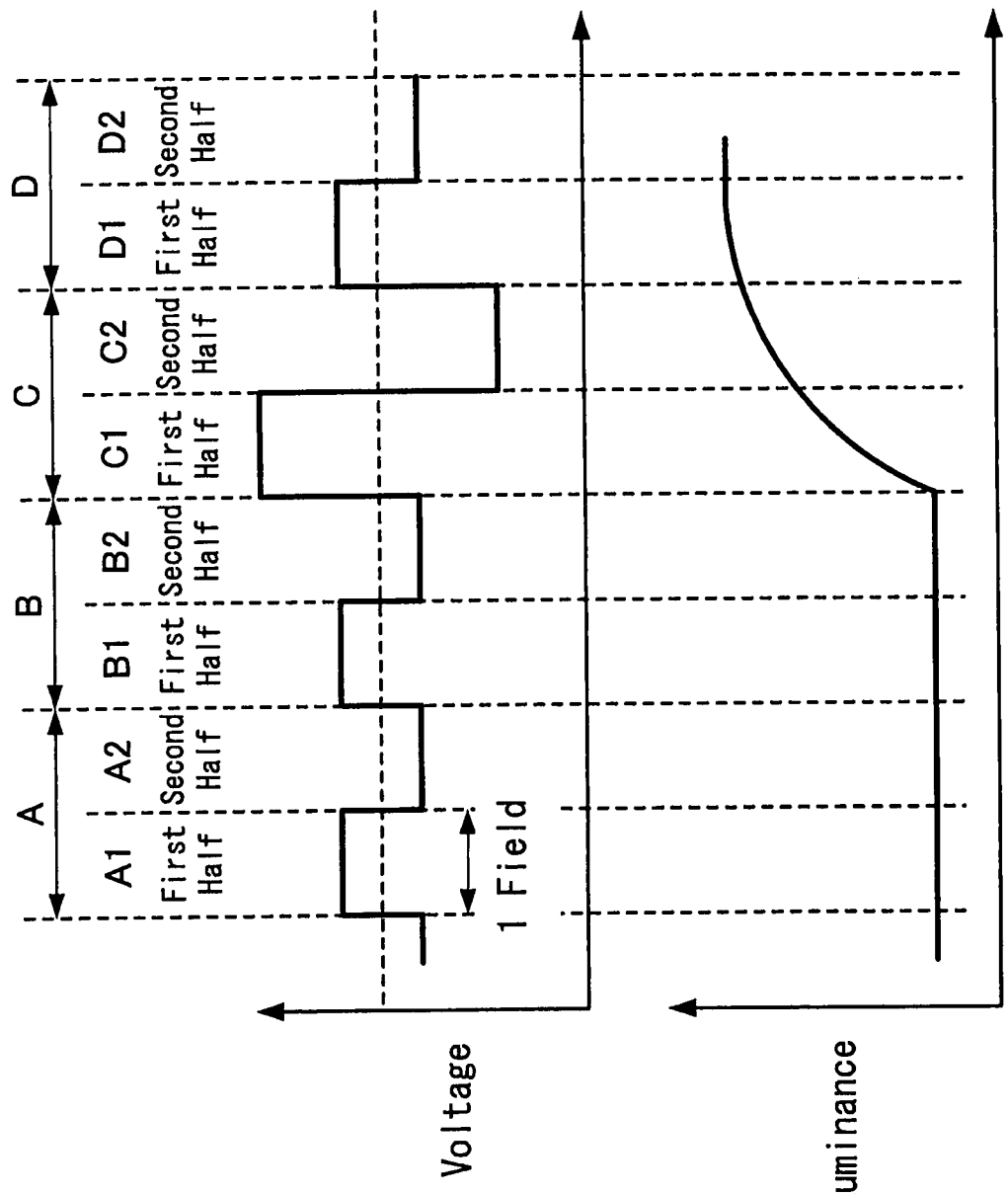
FIGS. 2A and 2B are exemplary diagrams showing an image signal having a polarity inverted by the multiplication processing performed thereon and a response of a liquid crystal panel.

The drive circuit section 2 includes a multiplication processing circuit 3, a corrected image signal generation circuit 4 and an inverse drive circuit 5. The multiplication processing circuit 3 is a circuit to multiply a frame rate of an input image signal by two as shown in FIG. 1. The image signal supplied to the drive circuit section 2 is then supplied to the corrected image signal generation circuit 4 after the multiplication processing is performed on the image signal in the multiplication processing circuit 3.

Figure 4:
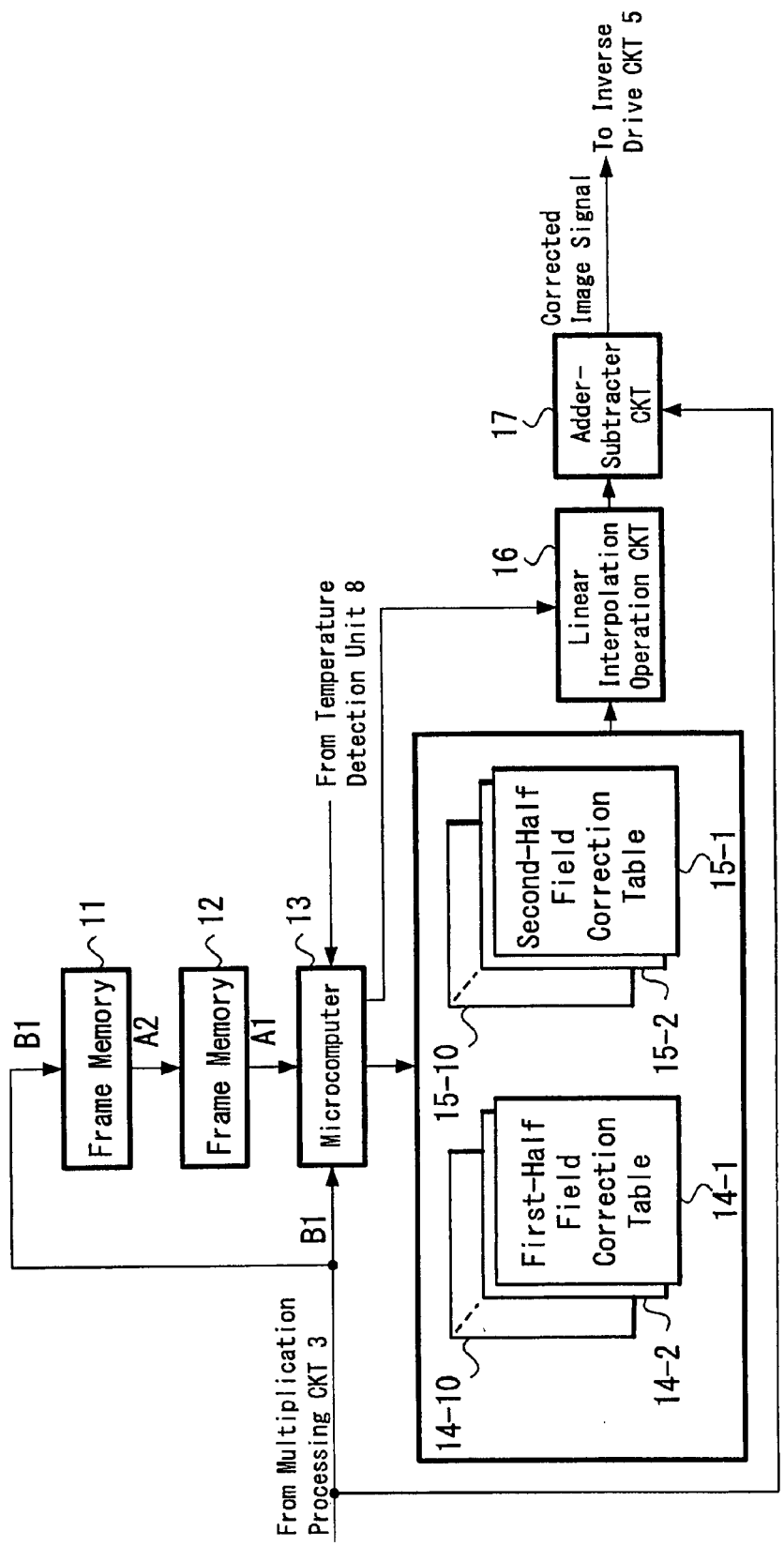
FIG. 4 is a block diagram showing a configuration of a corrected image signal generation circuit in FIG. 3.

FIG. 4 is a block diagram showing a configuration of the corrected image signal generation circuit 4. The corrected image signal generation circuit 4 includes two frame memories 11 and 12, a microcomputer 13, first-half field correction tables 14-1 through 14-10 and second-half field correction tables 15-1 through 15-10 that are made of ROMs, a linear interpolation operation circuit 16 and an adder-subtracter circuit 17.

The image signal of each field supplied from the multiplication processing circuit 3 (FIG. 3) to the corrected image signal generation circuit 4 is directly supplied to the microcomputer 13 and adder-subtracter circuit 17. Further, the image signal is written in the frame memory 11 for one field period, read out from the frame memory 11, written in the frame memory 12, and then read out from the frame memory 12 to be supplied to the microcomputer 13. As shown in FIG. 4, the image signal of the present field B1 among the fields A1, A2, B1, B2, C1, C2, D1, D2, - - - shown in FIG. 1 is directly supplied to the microcomputer 13 and then the image signal of the field A1 two fields before is read out from the frame memory 12 and supplied to the microcomputer 13. In the next field period, the image signal of the field B2 is directly supplied to the microcomputer 13, and then the image signal of the field A2 is read out from the frame memory 12 and supplied to the microcomputer 13.

Further, as shown in FIG. 3, a temperature detection unit 8 for detecting the temperature of a liquid crystal panel 7 is provided in the liquid crystal display device and data indicating the temperature detected by the temperature detection unit 8 is supplied to the microcomputer 13. (for example, a temperature sensor arranged in the vicinity of the liquid crystal panel 7, or a circuit for calculating the temperature based on a temperature characteristic of a diode provided in the inside of the liquid crystal panel 7 are used as the temperature detection unit.)

Figures 5A, 5B:
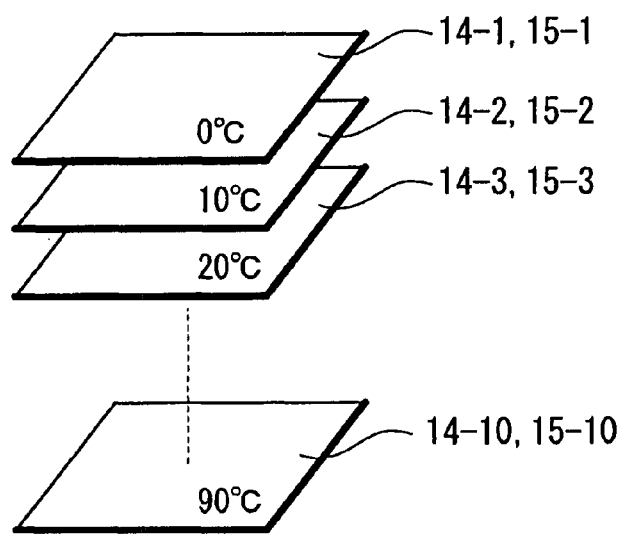
FIGS. 5A and 5B are diagrams showing an example of contents of a correction table in FIG. 4 and a correspondence relationship between respective correction tables and temperature.

The first-half field correction tables 14-1 through 14-10 and second-half field correction tables 15-1 through 15-10 are tables indicating a correspondence between the luminance gray scale of the image signal of the present field and the luminance gray scale of the image signal 2N (here, N=1) fields before and an amount of luminance correction, respectively. FIG. 5A is an exemplary diagram showing the contents of one table. In the table, values for the correction amount of luminance are stored corresponding to a 5×5 matrix composed of five stages of luminance gray scale 0, 1024, 2048, 3072 and 4095.

As shown in FIG. 5B, the tables 14-1 through 14-10 and tables 15-1 through 15-10 are tables respectively corresponding to ten stages of temperature 0° C. to 90° C. More specifically, the tables 14-1 and 15-1 are the tables for the temperature 0° C.; the tables 14-2 and 15-2 are the tables for the temperature 10° C.; and the tables 14-3 and 15-3 are the tables for the temperature 20° C. The tables similarly correspond to the temperatures in the subsequent tables such that the tables 14-10 and 15-10 are the tables for the temperature 90° C.

Since a liquid crystal material has such characteristic that the response speed becomes fast when the temperature is high, an absolute value of the correction amount of luminance shown in FIG. 5A is small with respect to the correction amount for high temperature in those tables. Also, an equal correction amount of luminance is prepared in the tables corresponding to the same temperature (the tables 14-1 and 15-1, tables 14-2 and 15-2, tables 14-3 and 15-3, - - - , and tables 14-10 and 15-10) among the tables 14-1 through 14-10 and tables 15-1 through 15-10.

The microcomputer 13 obtains for one field period the luminance gray scale of the image signal of the present field directly supplied from the multiplication processing circuit 3 and the luminance gray scale of the image signal two fields before supplied from the frame memory 12. Then, those obtained luminance gray scales are used as indices so that the data of the correction amount is read out as described below. At the field period in which the image signal of the first half field (A1, B1, C1, D1, - - - in FIG. 1) is supplied, the data of the correction amount is read out from the table corresponding to the temperature detected by the temperature detection unit 8 among the first-half field correction tables 14-1 through 14-10. At the field period in which the image signal of the second half field (A2, B2, C2, D2, - - - in FIG. 1) is supplied, the data of the correction amount is read out from the table corresponding to the temperature detected by the temperature detection unit 8 among the second-half field correction tables 15-1 through 15-10.

In the case where the obtained luminance gray scale is not exactly the value of 0, 1024, 2048, 3072 and 4095 shown in FIG. 5A but is intermediate value between those values, two pairs of luminance gray scales out of 0, 1024, 2048, 3072 and 4095 sandwiching the value of the obtained luminance gray scale are used as the indices so that two correction amounts are read out. For example, in the case where the obtained luminance gray scales of the present field and two fields before are 512 and 0 respectively and the data is read out from the table of the correction amount as shown in FIG. 5A, two pairs of 0 and 0, and 1024 and 0 are used as the indices so that the data of two correction amounts of 0 and 300 are read out.

Also, in the case where the temperature detected by the temperature detection unit 8 (FIG. 3) is not exactly 0° C., 10° C., 20° C., - - - 90° C. but is an intermediate value between those values, the correction amount data are read out from two tables respectively corresponding to the temperatures having the detected value in between. For example, in the case where the detected temperature is 25° C. in the field period in which the image signal of the first half field is supplied, the correction amount data are read out from the tables 14-3 and 14-4. However, in the case where the detected temperature is less than 0° C. or the detected temperature exceeds 90° C., the correction amount data are read out from tables respectively corresponding to 0° C. and 90° C. alone. (As another example, the correction amount data may not be read out from the tables in the case where the detected temperature is beyond the upper limit and lower limit of temperature such as 0° C. and 90° C.).

The correction amount data read out from the tables 14-1 through 14-10 or 15-1 through 15-10 is supplied to the linear interpolation operation circuit 16. In addition, the data of the luminance gray scales of the present field and two fields before obtained by the microcomputer 13 and the data indicating the temperature detected by the temperature detection unit 8 are supplied to the linear interpolation operation circuit 16 from the microcomputer 13.

In the case where the data of two correction amounts are supplied from the same table, the linear interpolation operation circuit 16 linearly interpolates the data of the two correction amounts using the data of the luminance gray scales of the present field and two fields before that are supplied from the microcomputer 13. For example, in the case where the luminance gray scales of the present field and two fields before are 512 and 0 respectively and the data of two correction amounts, which are 0 and 300 read out from the correction table as shown in FIG. 5A, are supplied, the correction amount 150 is obtained by linearly interpolating those 0 and 300 using a formula of $0 \times \{(1024-512)/1024\} + 300 \times \{(512-0)/1024\}$. Subsequently, the linearly interpolated correction amount data is output.

Also, in the case where the correction amount data are supplied from two tables respectively, the linear interpolation operation circuit 16 linearly interpolates the data of the two correction amounts using the data indicating the temperature supplied from the temperature detection unit 8. Then, the linearly interpolated correction amount data is output.

Further, in the case where the data of only one correction amount is supplied, the linear interpolation operation circuit 16 outputs the correction amount data unchanged.

The correction amount data output from the linear interpolation operation circuit 16 is supplied to the adder-subtracter circuit 17. The adder-subtracter circuit 17 generates a corrected image signal by adding the correction amount data supplied from the linear interpolation operation circuit 16 to the image signal of the present field supplied from the multiplication processing circuit 3 or subtracting the correction amount data therefrom (adding in the case of positive correction amount, and subtracting in the case of negative correction amount).

The corrected image signal is supplied to the inverse drive circuit 5 shown in FIG. 3 from the corrected image signal generation circuit 4. The inverse drive circuit 5 inverts the polarity of the corrected image signal for each field. Specifically, the first half fields (A1, B1, C1, D1, - - - in FIG. 1) are positive fields to have the positive polarity for the voltage of the common electrode (not illustrated) that is provided in the liquid crystal panel 7. The second half fields (A2, B2, C2, D2, - - - in FIG. 1) are the negative fields to have the negative polarity for the voltage of the common electrode (on the contrary, the first half fields may be the negative fields and the second half fields may be the positive fields).

The corrected image signal having been processed in the inverse drive circuit 5 is supplied to a D/A converter 6 from the drive circuit section 2 and the image signal is converted into an analogue signal and thereafter the analogue signal is supplied to a horizontal drive circuit (not illustrated) provided in the liquid crystal panel 7. (In the case where the liquid crystal panel 7 has a function of inputting and writing a digital image signal into the pixel electrode, the corrected image signal may be directly input from the drive circuit section 2 to the liquid crystal panel 7.) Also, a clock pulse for the timing control of horizontal scan and vertical scan is supplied to the horizontal drive circuit and a vertical drive circuit (not illustrated) provided in the liquid crystal panel 7 from a timing generator in the liquid crystal display device, although an illustration thereof is omitted in the figure. As a result, a corrected image signal is written in the pixel electrode (not illustrated) provided in the liquid crystal panel 7.

Figures 6A, 6B:
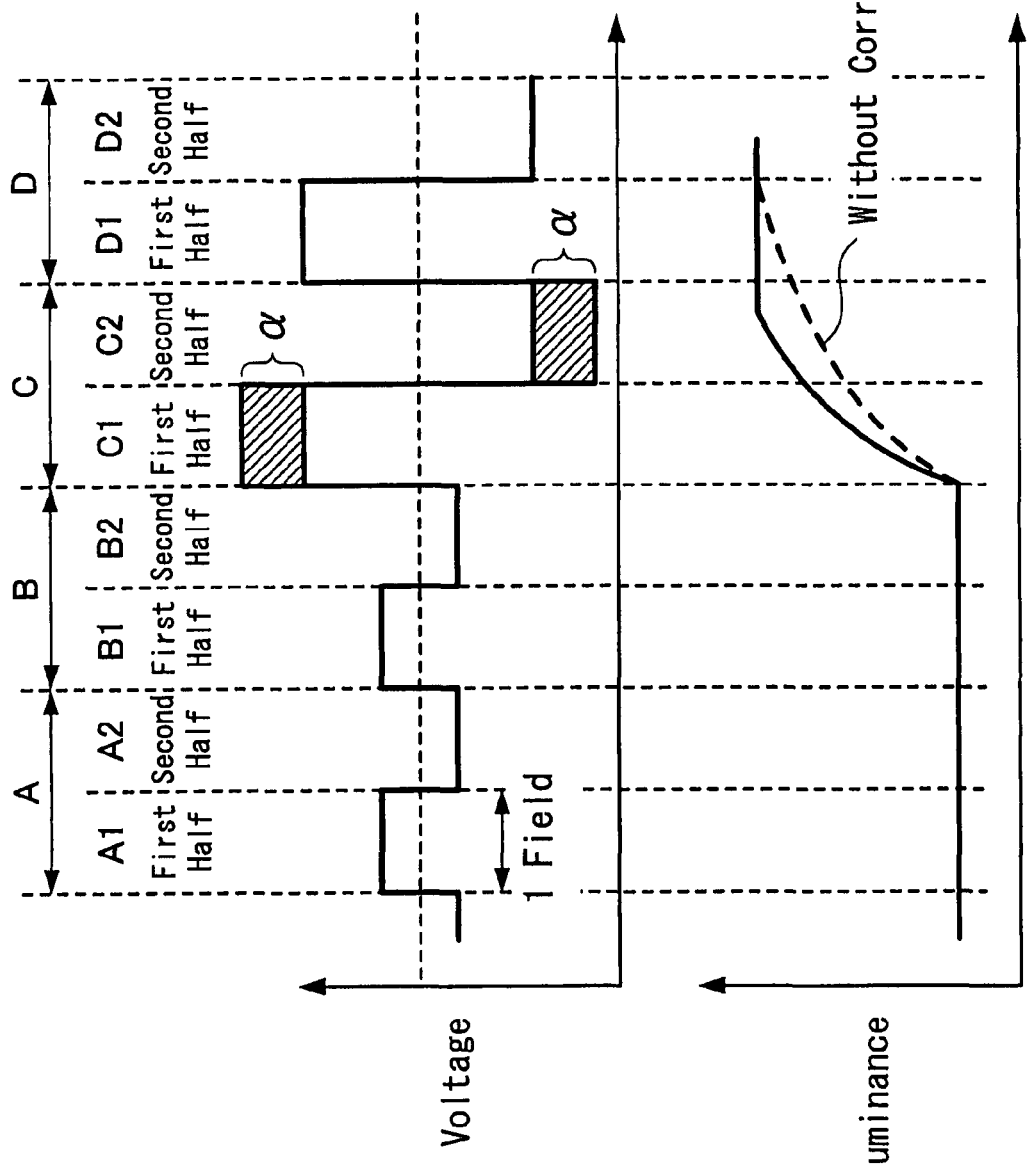
FIGS. 6A and 6B are exemplary diagrams showing a corrected image signal and a response of a liquid crystal panel in the first liquid crystal display device.

FIG. 6A is an exemplary diagram showing the corrected image signal supplied to the liquid crystal panel 7 in the first liquid crystal display device. The luminance changes greatly from the frame B to the frame C in the example. Therefore, the corrected image signal having the same correction amount a added to the image signal of field C1 and image signal of field C2 by the above-described processing performed at the corrected image signal generation circuit 4 are supplied to the liquid crystal panel 7. The corrected image signal with the positive polarity is supplied in the first half fields A1, B1, C1, D1, - - - , and the corrected image signal with the negative polarity is supplied to the liquid crystal panel 7 in the second half fields A2, B2, C2, D2, - - - .

FIG. 6B is a diagram showing the response of the liquid crystal panel 7 in the case of the corrected image signal shown in FIG. 6A being supplied along with the response (portion shown by broken line) in the case of the image signal without the correction amount being supplied to fields C1 and C2. In the case of the correction amount not being added to the image signal of fields C1 and C2, the luminance may not reach the intended level within the period of frame C and there may occur image deterioration such as a residual image. On the other hand, in the case of the correction amount being added to the image signal of fields C1 and C2, time to reach the intended luminance is shortened and the luminance reaches the intended level within the period of frame C. As a result, the picture quality can be improved.

Further, since the same correction amount is added to the image signal in a positive field and a negative field such as the field C1 and the field C2, DC balance of the voltage applied to the liquid crystal panel 7 can be maintained. Accordingly, time to reach the intended luminance is shortened while suppressing the deterioration of the liquid crystal panel 7 by maintaining the DC balance. As a result, the picture quality at the time of displaying a moving picture can be improved.

In addition, tables corresponding to ten stages of temperature from 0° C. to 90° C. are prepared based on such a characteristic of a liquid crystal material that the response speed becomes fast as the temperature becomes high. An amount of correction read out from the table corresponding to the present temperature of the liquid crystal panel 7 is added. Accordingly, the time to reach the intended luminance can be appropriately shortened.

It should be noted that selection of values in the gray scale in the correction table and the correspondence relation between the correction table and temperature described above are one example and may be suitably changed depending on an allowable circuit scale and a characteristic of the liquid crystal panel 7.

Further, an amount of correction corresponding to temperature prepared in the first-half field tables 14-1 through 14-10 is exactly the same as that in the second-half field tables 15-1 through 15-10 in the above-described embodiment. However, as another example, an amount of correction corresponding to temperature prepared in the first-half field tables 14-1 through 14-10 may be slightly different from that in the second-half field tables 15-1 through 15-10 within a range not deteriorating the DC balance of the voltage applied to the liquid crystal panel 7. (for example, an amount of correction in the first-half field tables 14-1 through 14-10 supplying first the image signal to the liquid crystal panel 7 may be slightly increased in order to improve the response speed of the liquid crystal material).

Alternatively, one of the tables 14-1 through 14-10 and the tables 15-1 through 15-10 may be prepared and the provided tables are used for the first half fields and second half fields in common, in the case where an amount of correction corresponding to temperature in the first half fields is exactly same as that in the second half fields as described in the above embodiment.

Moreover, one set of tables 14-1 through 14-10 and one set of tables 15-1 through 15-10 are provided respectively for the first half fields and second half fields in the above-described embodiment. However as another example, three sets of tables for image signals RGB may be provided respectively for the first half fields and second half fields. Accordingly, an amount of correction can be varied for respective image signals RGB. Therefore, the response speed of the signals RGB can be uniform in the case where the response characteristic of the liquid crystal panel 7 varies depending on the RGB (for example, in the case where the response speed for a signal G is slower than signal R due to a reason that the voltage for the signal G is lower than that for signal R to prevent a green color from becoming strong in a displayed picture).

Further, the multiplication processing of multiplying the frame rate of the input image signal by two is performed in the above-described embodiment, however the multiplication processing of multiplying the frame rate of the input image signal by 2N (here, N is an integer of 2 or more) may be performed. In such case, the number of frame memories provided in the corrected image signal generation circuit 4 shown in FIG. 4 is multiplied by 2N so that the image signal 2N fields before is supplied to the microcomputer 13 from the frame memory.

Figure 7:
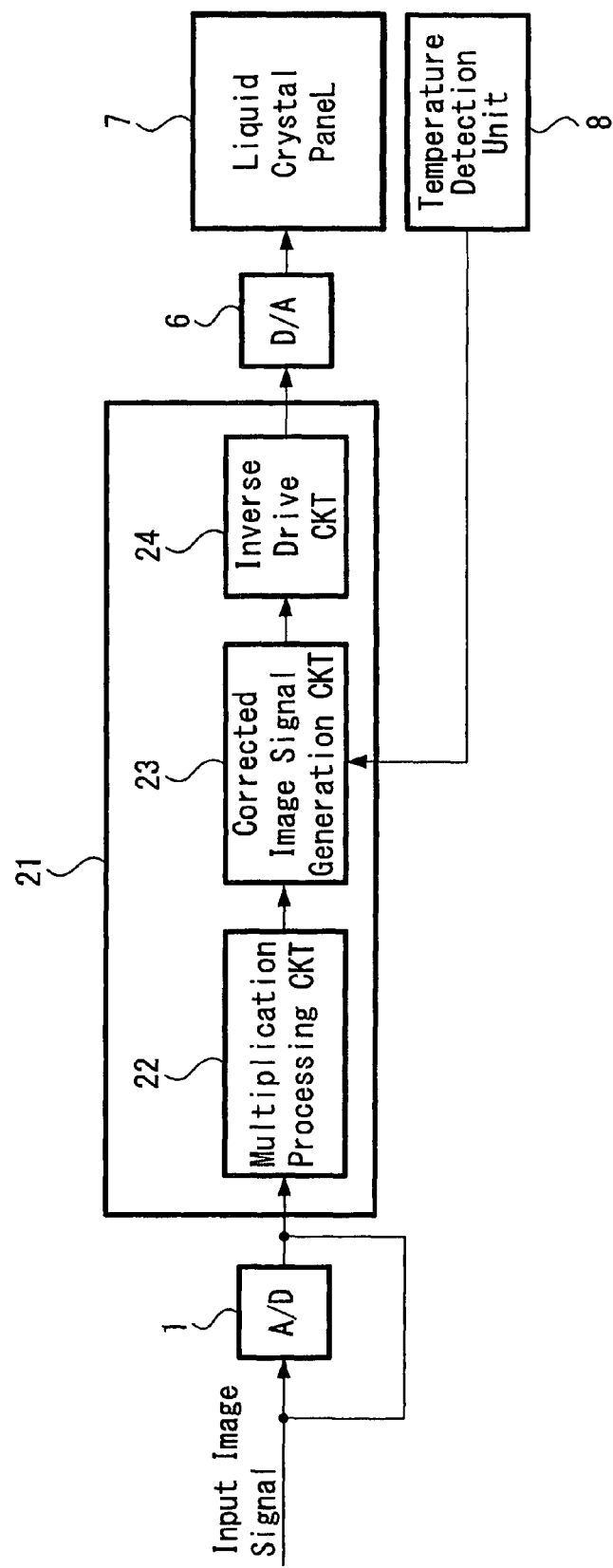
FIG. 7 is a block diagram showing a configuration example of a second liquid crystal display device to which an embodiment of the present invention is applied.

Second Liquid Crystal Display Device to which an Embodiment of the Present Invention is Applied Next, there is described a liquid crystal display device to which a second liquid crystal driver, liquid crystal driving method and liquid crystal display device according to an embodiment of the present invention are applied. FIG. 7 is a block diagram showing a configuration example of essential portions of the liquid crystal display device, in which the same reference numerals are given to portions corresponding to configuration and processing of the liquid crystal display device shown in FIG. 3 and redundant explanation thereof is omitted.

In the liquid crystal display device, configuration or processing of a multiplication processing circuit 22, corrected image signal generation circuit 23 and inverse drive circuit 24 provided in a drive circuit section 21 are different from that of the multiplication processing circuit 3, corrected image signal generation circuit 4 and inverse drive circuit 5 provided in the drive circuit section 2 shown in FIG. 3.

Figure 8:
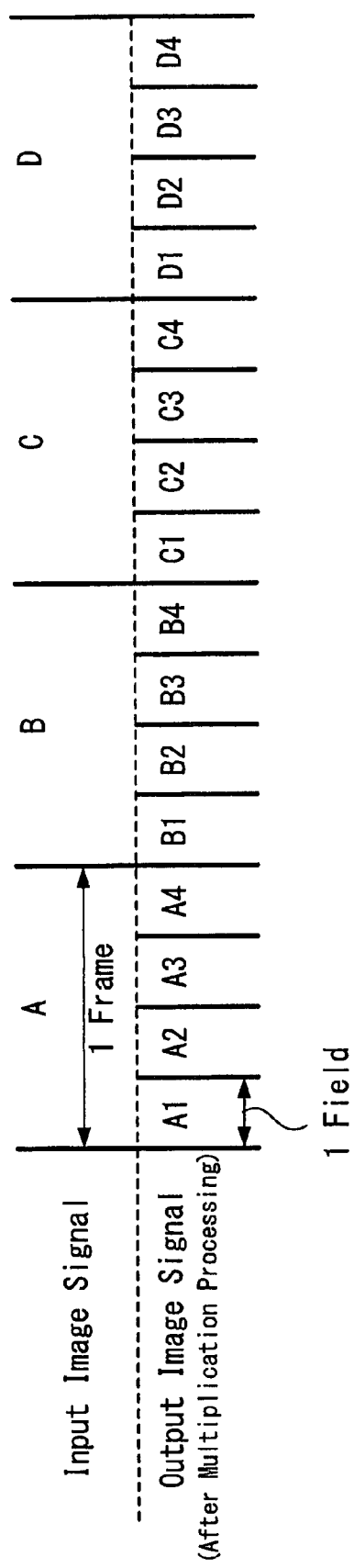
FIG. 8 is a diagram showing multiplication processing at a multiplication processing circuit in FIG. 7.

FIG. 8 shows multiplication processing performed at the multiplication processing circuit 22. The multiplication processing circuit 22 multiplies a frame rate of the input image signal by four. Accordingly, an input image signal of respective frames A, B, C, D, - - - is output as the image signal having four fields (two first-half fields and two second-half fields) of A1 through A4, B1 through B4, C1 through C4, D1 through D4, - - - . (Although delay time caused by the multiplication processing is disregarded and not illustrated in FIG. 8, actually there occurs a delay of several fields due to delayed multiplication processing.)

Figure 9:
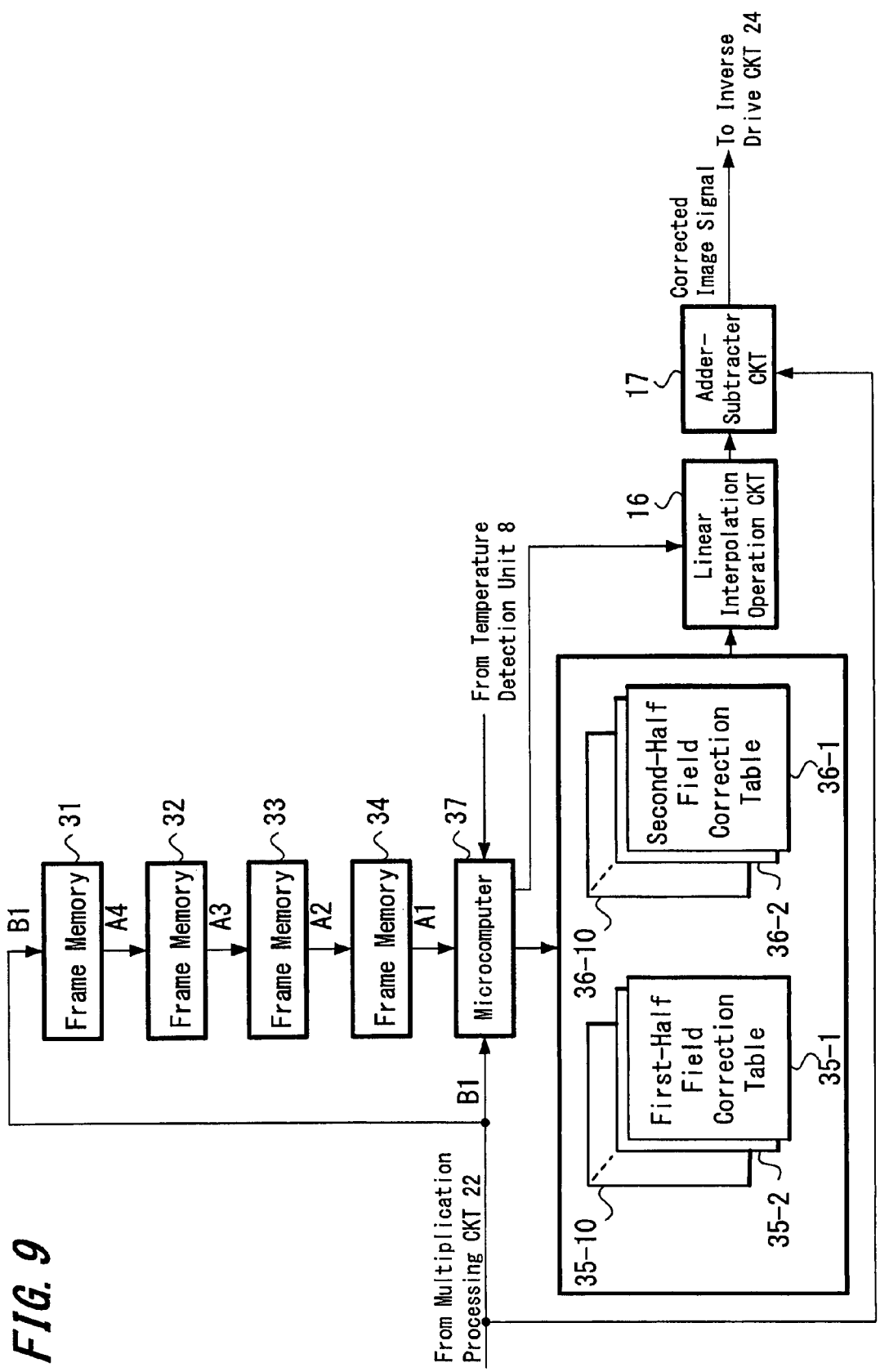
FIG. 9 is a block diagram showing a configuration of a corrected image signal generation circuit in FIG. 7.

FIG. 9 is a block diagram showing a configuration of the corrected image signal generation circuit 23, in which the same reference numerals are given to portions corresponding to configuration and processing of the corrected image signal generation circuit 4 shown in FIG. 4 and redundant explanation thereof is omitted.

The corrected image signal generation circuit 23 includes four frame memories 31 through 34, first-half field correction tables 35-1 through 35-10 and second-half field correction tables 36-1 through 36-10 which are different from the first-half field correction tables 14-1 through 14-10 and second-half field correction tables 15-1 through 15-10 shown in FIG. 4. In addition, a microcomputer 37 is included to perform processing different from that performed in the microcomputer 13 shown in FIG. 3.

The image signal of each field supplied from the multiplication processing circuit 22 (FIG. 7) to the corrected image signal generation circuit 23 is directly supplied to the microcomputer 37 and adder-subtracter circuit 17. Further, the image signal is written in the frame memory 31 for one field period, read out from the frame memory 31, written in the frame memory 32, read out from the frame memory 32, written in the frame memory 33, read out from the frame memory 33, written in the frame memory 34, and then read out from the frame memory 34 to be supplied to the microcomputer 37. As shown in FIG. 9, the image signal of the present field B1 among the fields A1, A2, A3, A4, B1, B2, B3, B4, C1, C2, C3, C4, D1, D2, D3, D4, - - - shown in FIG. 8 is directly supplied to the microcomputer 37. In addition, the image signal of the field A1 four fields before is read out from the frame memory 34 and supplied to the microcomputer 37.

The first-half field correction tables 35-1 through 35-10 and second-half field correction tables 36-1 through 36-10 are tables corresponding to ten stages of temperature 0° C. to 90° C. similarly to the tables 14-1 through 14-10 and tables 15-1 through 15-10 shown in FIG. 4. However, a correction amount of luminance in the first-half field correction table is twice as large as a correction amount of luminance in the second-half field correction table between the tables corresponding to the same temperature among the first-half field correction tables 35-1 through 35-10 and second-half field correction tables 36-1 through 36-10.

FIGS. 10A and 10B are exemplary diagrams showing contents of respective tables corresponding to the same temperature among the first-half field correction tables 35-1 through 35-10 and second-half field correction tables 36-1 through 36-10. In the first-half field correction table, a correction amount of luminance corresponding to each value in 5×5 matrix representing five stages of the luminance gray scale of 0, 0124, 2048, 3072 and 4095 is twice as large as the correction amount shown in the second-half field correction table.

The microcomputer 37 obtains the luminance gray scale of the image signal of the present field directly supplied from the multiplication processing circuit 22 and the luminance gray scale of the image signal of four fields before supplied from the field memory 34 in a field period where the image signal of a front field (A1, B1, C1, D1, - - - in FIG. 8) among the first half fields is supplied and in a field period where the image signal of respective second half fields (A3 and A4, B3 and B4, C3 and C4, D3 and D4, - - - in FIG. 8) is supplied. Then, the obtained luminance gray scale is used as the index to read out the correction amount data. Here, the microcomputer 37 reads out the correction amount data from the table corresponding to the temperature detected by the temperature detection unit 8 among the first-half field correction tables 35-1 through 35-10 during the field period where the image signal of the front field among the first half fields is supplied. Further, the microcomputer 37 reads out the correction amount data from the table corresponding to the temperature detected by the temperature detection unit 8 among the second-half field correction tables 36-1 through 36-10 during the field period where the image signal of the second half fields is supplied.

However, during the field period where the image signal of the second field (A2, B2, C2, D2, - - - in FIG. 8) in the first-half fields is supplied, the microcomputer 37 neither obtains the luminance gray scale of the image signal nor reads out data from the first-half field correction tables 35-1 through 35-10 (or, the microcomputer 37 obtains the luminance gray scale of the image signal but does not read out the data from the first-half field correction tables 35-1 through 35-10).

The inverse drive circuit 24 shown in FIG. 7 inverts the polarity of the corrected image signal supplied from the corrected image signal generation circuit 23 for each field. Specifically, the first half fields (A1 and A2, B1 and B2, C1 and C2, D1 and D2, - - - in FIG. 8) are positive fields to have the positive polarity for the voltage of the common electrode (not illustrated) that is provided in the liquid crystal panel 7. The second half fields (A3 and A4, B3 and B4, C3 and C4, D3 and D4, - - - in FIG. 8) are negative fields to have the negative polarity for the voltage of the common electrode (on the contrary, the first half fields may be the negative fields and the second half fields may be the positive fields).

Figure 11:
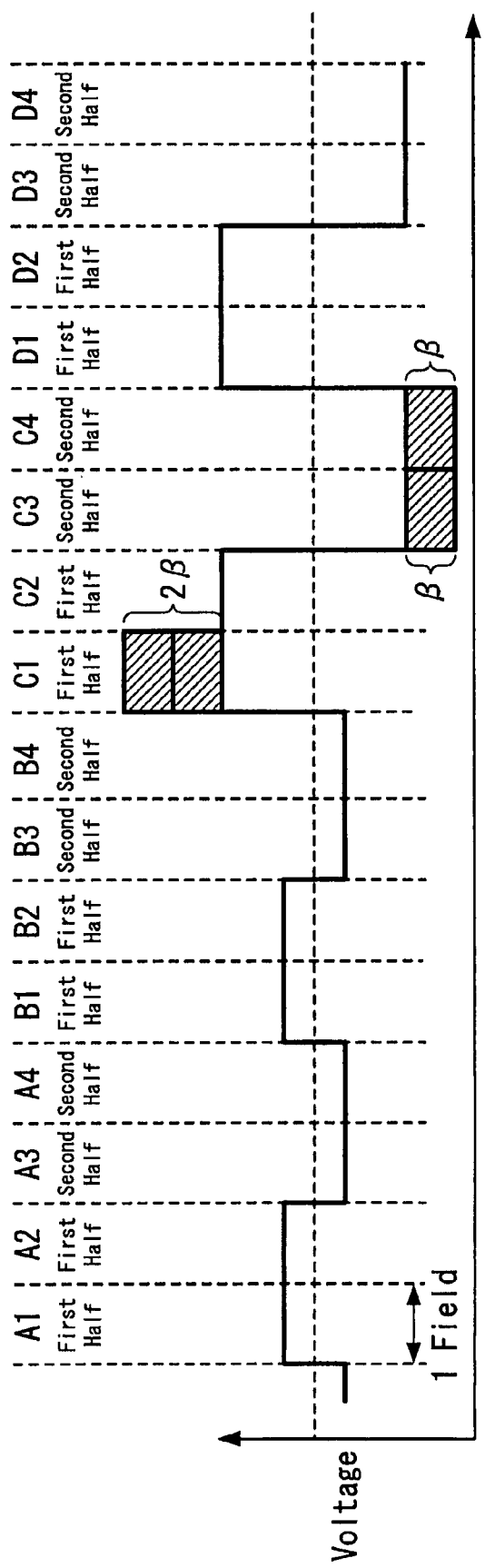
FIG. 11 is an exemplary diagram showing a corrected image signal in the second liquid crystal display device.

FIG. 11 is an exemplary diagram showing the corrected image signal supplied to the liquid crystal panel 7 in the second liquid crystal display device. As shown in FIG. 11, luminance changes greatly from the frame B to the frame C in this example. Therefore, correction amount 2β is added to the image signal of field C1 and the correction amount β that is one half the correction amount added to the field C1 is added to the fields C3 and C4 respectively by the above-described processing performed at the corrected image signal generation circuit 23. The corrected image signal is then supplied to the liquid crystal panel 7 with the positive polarity in the first half fields of A1 and A2, B1 and B2, C1 and C2, D1 and D2, - - - . Further, the corrected signal is supplied to the liquid crystal panel 7 with the negative polarity in the second half fields of A3 and A4, B3 and B4, C3 and C4, D3 and D4, - - - .

According to the embodiment, an amount of correction larger than that of the other fields is added to the front field among the fields supplying first the image signal to the liquid crystal panel out of the positive fields and negative fields (here, the first half fields are the positive fields). Since the image signal corrected as described above is then supplied to the liquid crystal panel 7, time to reach the intended luminance is further shortened and the picture quality at the time of displaying a moving picture is further improved. Furthermore, the same correction amount as the correction amount added to the front field among the positive fields is divided (here, one half each) and added to all the fields with respect to the fields not supplying first the image signal to the liquid crystal panel out of the positive fields and negative fields (here, the negative fields of the second half fields). Accordingly, DC balance of the voltage applied to the liquid crystal panel 7 is maintained if two fields of the positive fields and two fields of the negative fields divided from one frame are respectively viewed as a whole. Consequently, the picture quality at the time of displaying a moving picture can be further improved while suppressing the deterioration of the liquid crystal panel 7 by maintaining the DC balance.

It should be noted that in the embodiment with respect to the tables corresponding to the same temperature a ratio of the correction amount in the first-half field correction tables 35-1 through 35-10 may be slightly different from twice the ratio in the second-half field correction tables 36-1 through 36-10 (for example, slightly larger than two times) within a range not deteriorating the DC balance of the voltage applied to the liquid crystal panel 7.

Further, the multiplication processing of multiplying a frame rate of an input image signal by 2N (here, N is an integer of 3 or more) may be performed in the embodiment. In this case, the number of frame memories provided in the corrected image signal generation circuit 23 shown in FIG. 9 is multiplied by 2N so that the image signal 2N fields before is supplied to the microcomputer 37 from the frame memory.

Furthermore, three sets of tables for image signals RGB may be provided respectively for the first half fields and second half fields in the embodiment similarly to the first liquid crystal display device according to the embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display driver, in which a frame rate of an input image signal is multiplied by 2N (N is an integer of one or more), so that each frame is divided into N positive field(s) and N negative field(s) respectively, the image signal is supplied to a liquid crystal panel with a positive polarity in a positive field, and the image signal is supplied to the liquid crystal panel with a negative polarity in a negative field, comprising:

corrected image signal generating portion for generating a corrected image signal having a substantially same overall amount of correction added to the positive field and the negative field, wherein the corrected image signal generated by the corrected image signal generating portion is supplied to the liquid crystal panel with the positive polarity in the positive field and the corrected image signal generated by the corrected image signal generating portion is supplied to the liquid crystal panel with the negative polarity in the negative field, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

2. A liquid crystal driver according to claim 1, further comprising a detector configured to detect the temperature of the liquid crystal panel, wherein the corrected image signal generating portion generates the corrected image signal such that the amount of correction becomes small as the temperature detected by the detector becomes high.

3. A liquid crystal driving method, in which a frame rate of an input image signal is multiplied by 2N (N is an integer of one or more), so that each frame is divided into N positive field(s) and N negative field(s) respectively, the image signal is supplied to a liquid crystal panel with a positive polarity in a positive field, and the image signal is supplied to the liquid crystal panel a negative polarity in a negative field, comprising:

generating a corrected image signal having a same overall amount of correction added to the positive field and the negative field in response to a luminance of the image signal of the N positive field(s) and N negative field(s) respectively divided from the each frame, and supplying the corrected image signal generated at the generating step to the liquid crystal panel with the positive polarity in the positive field and the corrected image signal generated at the generating step to the liquid crystal panel with the negative polarity in the negative field, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

4. A liquid crystal driving method according to claim 3, further comprising the step of
detecting the temperature of the liquid crystal panel, wherein
the corrected image signal is generated at the generating step such that the amount of correction becomes small as the temperature detected at the detecting step becomes high.

5. A liquid crystal display device comprising:
a liquid crystal panel, and
a drive circuit in which a frame rate of an input image signal is multiplied by 2N (N is an integer of one or more), so that each frame is divided into N positive field(s) and N negative field(s) respectively, the image signal is supplied to the liquid crystal panel with a positive polarity in a positive field, and the image signal is supplied to the liquid crystal panel with a negative polarity in a negative field, wherein
the drive circuit includes
a corrected image signal generator configured to generate a corrected image signal having the same amount of correction added to the positive field and the negative field in response to a luminance of the image signal of the N positive field(s) and N negative field(s) respectively divided from the each frame and a luminance of the image signal 2N fields before the respective positive field and negative field, and
wherein the signal correction amounts are selected from tables of values that are determined corresponding to display temperature conditions, and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

6. A liquid crystal display device according to claim 5, further comprising
a detector configured to detect the temperature of the liquid crystal panel, wherein
the corrected image signal generator generates the corrected image signal such that the amount of correction becomes small as the temperature detected by the detector becomes high.

7. A liquid crystal driver, in which a frame rate of an input image signal is multiplied by 2N (N is an integer of two or more), so that each frame is divided into N positive fields and N negative fields respectively, the image signal is supplied to a liquid crystal panel with a positive polarity in a positive field, and the image signal is supplied to the liquid crystal panel with a negative polarity in a negative field, comprising:
corrected image signal generating portion for generating a corrected image signal for the positive field and the negative field in response to a luminance of the image signal of the N positive fields and N negative fields respectively divided from the each frame, wherein
the corrected image signal generated by the corrected image signal generating portion is supplied to the liquid crystal panel with the positive polarity in the positive field and the corrected image signal generated by the corrected image signal generating portion is supplied to the liquid crystal panel with the negative polarity in the negative field and wherein the signal correction amounts are selected from tables of values that are determined corresponding to display temperature conditions, and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

8. A liquid crystal driver according to claim 7, further comprising
a detector configured to detect the temperature of the liquid crystal panel, wherein
the corrected image signal generating portion generates the corrected image signal such that the amount of correction becomes small as the temperature detected by the detector becomes high.

9. A liquid crystal driving method, in which a frame rate of an input image signal is multiplied by 2N (N is an integer of two or more), so that each frame is divided into N positive fields and N negative fields respectively, the image signal is supplied to a liquid crystal panel with a positive polarity in a positive field, and the image signal is supplied to the liquid crystal panel with a negative polarity in a negative field, comprising the steps of:
generating a corrected image signal for the positive field and the negative field in response to a luminance of the image signal of the N positive fields and N negative fields respectively divided from the each frame and a luminance of the image signal 2N fields before the positive field and negative field; and
supplying the corrected image signal generated at the preceding steps to the liquid crystal panel with the positive polarity in the positive field and the corrected image signal generated at the preceding steps to the liquid crystal panel with the negative polarity in the negative field and wherein the signal correction amounts are selected from tables of values that are determined corresponding to display temperature conditions, and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

10. A liquid crystal driving method according to claim 9, further comprising the step of
detecting the temperature of the liquid crystal panel, wherein
the corrected image signal is generated at generating, adding, and dividing and adding steps such that the amount of correction becomes small as the temperature detected at the detecting step becomes high.

11. A liquid crystal display device comprising:
a liquid crystal panel, and
a drive circuit in which a frame rate of,an input image signal is multiplied by 2N (N is an integer of two or more), so that each frame is divided into N positive fields and N negative fields respectively, the image signal is supplied to the liquid crystal panel with the positive polarity in a positive field, and the image signal is supplied to the liquid crystal panel with the negative polarity in a negative field, wherein
the drive circuit includes
a corrected image signal generator configured to generate a corrected image signal for the positive field and negative field in response to a luminance of the image signal including the N positive fields and N negative fields respectively divided from the each frame, and
the corrected image signal generated by the corrected image signal generator is supplied to the liquid crystal panel with the positive polarity in the positive field and the corrected image signal generated by the corrected image signal generator is supplied to the liquid crystal panel with the negative polarity in the negative field, and wherein the signal correction amounts are selected from tables of values that are determined corresponding to display temperature conditions, and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

12. A liquid crystal display device according to claim 11, further comprising
a detector to detect the temperature of the liquid crystal panel, wherein
the corrected image signal generator generates the corrected image signal such that the amount of correction becomes small as the temperature detected by the detector becomes high.

13. A driver for a liquid crystal panel, multiplying a frame rate of an input image signal by 2N (N is an integer of one or more), dividing each frame into. N positive field(s) and N negative field(s) respectively, and supplying the image signal to the liquid crystal panel with a positive polarity in a positive field and with a negative polarity in a negative field, said driver comprising:
a corrected image signal generator configured to generate a corrected image signal having the same amount of correction added to the positive field and the negative field in response to a luminance of the image signal of the N positive field(s) and N negative field(s) respectively divided from the each frame and a luminance of the image signal 2N fields before the respective positive field and negative field, wherein
the corrected image signal generated by the corrected image signal generator is supplied to the liquid crystal panel with the positive polarity in the positive field and the corrected image signal generated by the corrected image signal generator is supplied to the liquid crystal panel with the negative polarity in the negative field and wherein the signal correction amounts are selected from tables of values that are determined corresponding to display temperature conditions, and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

14. A driver for a liquid crystal panel, multiplying a frame rate of an input image signal by 2N (N is an integer of one or more), dividing each frame into N positive field(s) and N negative field(s) respectively, and supplying the image signal to the liquid crystal panel with a positive polarity in a positive field and with a negative polarity in a negative field, said driver comprising:
a corrected image signal generator configured to generate a corrected image signal for the positive field and the negative field in response to a luminance of the image signal of the N positive fields and N negative fields respectively, said corrected image signal generator configured to add a predetermined amount of correction to a front field alone among the N fields out of the positive fields and negative fields supplying first the image signal to the liquid crystal panel, wherein
the corrected image signal generated by the corrected image signal generator is supplied to the liquid crystal panel with the positive polarity in the positive field and the corrected image signal generated by the corrected image signal generator is supplied to the liquid crystal panel with the negative polarity in the negative field and further wherein a separate table of correction values is provided for each of a plurality of temperature values, and selection of the correction values to be applied from a designated table are based on both a determined temperature and image signal luminance data in order to select an appropriate correction amount, and wherein a processor determines which correction values are to be applied from the tables of values based on the determined temperature and information from a plurality of frame memories containing multiple frames of image information in addition to the current frame data, and wherein the tables of values include first-half field correction tables and second-half field correction tables which determine correction based on luminance gray scale of the image signal of a current field and luminance gray scale of the image signal 2N fields before.

* * * * *